(12) United States Patent
Zhu et al.

(10) Patent No.: US 12,353,339 B2
(45) Date of Patent: Jul. 8, 2025

(54) DATA TRANSFER METHOD, DATA TRANSFER DEVICE AND COMPUTER READABLE STORAGE MEDIUM

(71) Applicants: Chongqing BOE Optoelectronics Technology Co., Ltd., Chongqing (CN); BOE Technology Group Co., Ltd., Beijing (CN)

(72) Inventors: Wentao Zhu, Beijing (CN); Gaoming Sun, Beijing (CN); Jingchao Yuan, Beijing (CN); Zhiheng Zhou, Beijing (CN); Hongxin Pan, Beijing (CN); Jingpeng Zhao, Beijing (CN); Xin Duan, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/036,170

(22) PCT Filed: Mar. 28, 2022

(86) PCT No.: PCT/CN2022/083273
§ 371 (c)(1),
(2) Date: May 10, 2023

(87) PCT Pub. No.: WO2023/184064
PCT Pub. Date: Oct. 5, 2023

(65) Prior Publication Data
US 2024/0370389 A1 Nov. 7, 2024

(51) Int. Cl.
*G06F 13/16* (2006.01)

(52) U.S. Cl.
CPC ...... *G06F 13/1684* (2013.01); *G06F 13/1657* (2013.01); *G06F 13/1678* (2013.01)

(58) Field of Classification Search
None
See application file for complete search history.

(56) References Cited

U.S. PATENT DOCUMENTS

2004/0025040 A1* 2/2004 Aoki .................. G06F 21/72
713/193
2007/0266186 A1* 11/2007 Woodral ............. G06F 13/423
710/16

(Continued)

FOREIGN PATENT DOCUMENTS

CA 3128537 A1 2/2022
CN 201995071 U 9/2011

(Continued)

OTHER PUBLICATIONS

International Search Report for PCT/CN2022/083273 Mailed Dec. 7, 2022.

*Primary Examiner* — Saptarshi Mazumder
(74) *Attorney, Agent, or Firm* — Ling Wu; Stephen Yang; Ling and Yang Intellectual Property

(57) ABSTRACT

A data transfer method, a data transfer device and a computer readable storage medium. The data transfer device comprises at least one first-stage memory, at least one second-stage memory and at least one third-stage memory which are connected in sequence. The data transfer method comprises: receiving a first input comprising a number of input lanes and/or a number of output lanes; selecting a corresponding second-stage memory and controlling a first read signal and a second read signal, according to the number of input lanes and/or the number of output lanes; storing data of the input lanes through the at least one first-stage memory; reading data of the first-stage memory and writing the data into the corresponding second-stage memory when the first read signal is enabled; and reading data of the corresponding second-stage memory and writing (Continued)

the data into the third-stage memory when the second read signal is enabled.

20 Claims, 7 Drawing Sheets

(56) References Cited

U.S. PATENT DOCUMENTS

2008/0301605 A1* 12/2008 Ando .................. G06F 30/30
716/113
2009/0033387 A1  2/2009 Heragu et al.

FOREIGN PATENT DOCUMENTS

| CN | 109656632 A | 4/2019 |
| CN | 107680540 B | 6/2019 |
| CN | 111240862 A | 6/2020 |
| CN | 111614357 A | 9/2020 |
| CN | 112115190 A | 12/2020 |
| CN | 112714270 A | 4/2021 |
| CN | 113377369 A | 9/2021 |

* cited by examiner

DATA TRANSFER METHOD, DATA TRANSFER DEVICE AND COMPUTER READABLE STORAGE MEDIUM

CROSS-REFERENCE TO RELATED APPLICATION

The present application is a U.S. National Phase Entry of International Application No. PCT/CN2022/083273 having an international filing date of Mar. 28, 2022, the content of which is incorporated into this application by reference.

TECHNICAL FIELD

Embodiments of the present disclosure relate to, but are not limited to, the field of display driving technology, and in particular, to a data transfer method, a data transfer device, and a computer readable storage medium.

BACKGROUND

A Field Programmable Gate Array (FPGA) is a programmable device with great flexibility, which is one of the two conventional schemes of display driver (the other is an Application Specific Integrated Circuit (ASIC)).

When the FPGA is used as the driving control system scheme of the display screen, an exemplary system architecture diagram is shown in FIG. 1. Display interface circuit, Transfer circuit, Mapping circuit, P2P (peer to peer) protocol circuit (including a protocol layer and a physical layer) and GOA (Gate Driver on Array) control circuit may all be realized by the FPGA. The display interface circuit receives the display data from the front end (such as a player). The commonly used interface types include a Display Port (DP), a High Definition Multimedia Interface (HDMI) and so on. Mapping circuit arranges front-end data according to a specific rule, which has great correlation with a pixel architecture of a display panel and a P2P protocol. The transfer circuit is used to realize the correct adaptation between the interface circuit and the mapping circuit. Since the number of lanes output by the interface circuit is not always equal to the number of lanes input by the mapping circuit, the main function of the transfer circuit is to transfer the number of lanes. For example, if there are 2 lanes for output of the interface circuit and 8 lanes for input of the mapping circuit, the transfer circuit needs to realize the lane transfer of "2 to 8".

SUMMARY

The following is a summary of subject matters described herein in detail. The summary is not intended to limit the protection scope of claims.

An embodiment of the present disclosure provides a data transfer method applied to a data transfer device including at least one first-stage memory, at least one second-stage memory and at least one third-stage memory which are connected in sequence. The method includes:
receiving a first input including a number of input lanes and/or a number of output lanes;
selecting a corresponding second-stage memory according to the number of input lanes and/or the number of output lanes, and controlling a first read signal and a second read signal according to the number of input lanes and/or the number of output lanes;
storing data of the input lanes through the at least one first-stage memory;
reading data of the at least one first-stage memory and writing the data into the corresponding second-stage memory when the first read signal is enabled; and
reading data of the corresponding second-stage memory and writing the data into the at least one third-stage memory when the second read signal is enabled.

In some exemplary embodiments, a number of the at least one first-stage memory is the same as a maximum input lane number, and each first-stage memory is connected to one input lane in one-to-one correspondence.

In some exemplary embodiments, a number of the at least one third-stage memory is the same as a maximum output lane number, and each third-stage memory is connected to one output lane in one-to-one correspondence.

In some exemplary embodiments, a number of the at least one second-stage memory is set according to a number of classes of numbers of input lanes, and each second-stage memory is connected to the first-stage memories corresponding to a number of input lanes of one class; and
the selecting the corresponding second-stage memory according to the number of input lanes and/or the number of output lanes includes:
selecting the corresponding second-stage memory according to the number of input lanes, and selecting multiple corresponding third-stage memories according to a preset number of output lanes.

In some exemplary embodiments, the number of the at least one second-stage memory is set according to a number of classes of numbers of output lanes, and each second-stage memory is connected to the third-stage memories corresponding to a number of input lanes of one class; and
the selecting the corresponding second-stage memory according to the number of input lanes and/or the number of output lanes includes:
selecting multiple corresponding third-stage memories and one corresponding second-stage memory according to the number of output lanes.

In some exemplary embodiments, an input bit width of each second-stage memory is the same as a total output bit width of one or more first-stage memories to which the second-stage memory is connected, and an output bit width of each second-stage memories is the same as a total output bit width of one or more third-stage memories to which the second-stage memory is connected.

In some exemplary embodiments, the second-stage memory includes a first sub-second-stage memory and a second sub-second-stage memory which are connected in sequence, a number of first sub-second-stage memories is set according to a number of classes of numbers of input lanes, each first sub-second-stage memory is connected to first-stage memories corresponding to a number of input lanes of one class, and a number of second sub-second-stage memories is set according to a number of classes of numbers of output lanes.

In some exemplary embodiments, an input bit width of each first sub-second-stage memory is the same as a total output bit width of one or more first-stage memories to which the first sub-second-stage memory is connected, an output bit width of each first sub-second-stage memory is the same as a total bit width of the output lanes corresponding to a preset minimum output lane number, an input bit width of each second sub-second-stage memory is the same as a total bit width of the output lanes corresponding to a preset minimum output lane number, and an output bit width of each second sub-second-stage memory is the same as a total input bit width of one or more third-stage memories to which the second sub-second-stage memory is connected.

In some exemplary embodiments, the second read signal includes a first sub-second read signal and a second sub-second read signal; the selecting the corresponding second-stage memory according to the number of input lanes and/or the number of output lanes includes: selecting a corresponding first sub-second-stage memory according to the number of input lanes, and selecting a corresponding second sub-second-stage memory and a third-stage memory according to the number of output lanes; and the reading the data of the at least one first-stage memory and writing the data into the corresponding second-stage memory when the first read signal is enabled, and reading the data of the corresponding second-stage memory and writing the data into the at least one third-stage memory, includes: reading data of the at least one first-stage memory and writing the data into the corresponding first sub-second-stage memory when the first read signal is enabled; reading data of the corresponding first sub-second-stage memory and writing the data into the second sub-second-stage memory when the first sub-second read signal is enabled; and reading data of the second sub-second-stage memory and writing the data into the corresponding third-stage memory when the second sub-second read signal is enabled.

In some exemplary embodiments, the second-stage memory includes one second-stage memory, an input bit width of the second-stage memory is equal to a sum of bit widths of all the input lanes, and an output bit width of the second-stage memory is equal to a sum of bit widths of all the output lanes; the reading the data of the corresponding second-stage memory and writing the data into the corresponding third-stage memory when the second read signal is enabled, includes: reading data of the second-stage memory when the second read signal is enabled; selecting active data in the read data according to the number of input lanes; and writing the selected active data into the corresponding third-stage memory according to the number of output lanes.

In some exemplary embodiments, the method further includes:
controlling a third read signal according to a preset timing; and
reading data of the third-stage memory and writing the data into the corresponding output lane when the third read signal is enabled.

An embodiment of the present disclosure further provides a data transfer device, including a lane number control circuit, a data continuity circuit, a data recombination circuit and a data distribution circuit.

The lane number control circuit is configured to receive a first input including a number of input lanes and/or a number of output lanes, select a corresponding first-stage memory and third-stage memory according to the number of input lanes and/or the number of output lanes, and control a first read signal and a second read signal according to the number of input lanes and/or the number of output lanes.

The data continuity circuit includes multiple first-stage memories and is configured to store data of the input lanes through at least one first-stage memory.

The data distribution circuit includes multiple third-stage memories.

The data recombination circuit includes at least one second-stage memory and is configured to receive the first read signal and the second read signal, read data of the first-stage memories and write the data into a corresponding second-stage memory when the first read signal is enabled; and read data of the corresponding second-stage memory and write the data into the third-stage memories when the second read signal is enabled.

An embodiment of the present disclosure further provides a data transfer device, including a memory and a processor connected to the memory, wherein the memory is configured to store instructions, the memory further includes a first-stage memory, a second-stage memory, and a third-stage memory, and the processor is configured to perform acts of the data transfer method of any one of the preceding items based on the instructions stored in the memory.

An embodiment of the present disclosure further provides a computer readable storage medium on which a computer program is stored, wherein the data transfer method of any one of the preceding items is implemented when the computer program is executed by a processor.

Other aspects may be comprehended upon reading and understanding drawings and detailed descriptions.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are only intended to schematically illustrate contents of the present disclosure.

DETAILED DESCRIPTION

To make objectives, technical solutions, and advantages of the present disclosure clearer, the embodiments of the present disclosure will be described in detail with reference to the accompanying drawings. It needs to be noted that the embodiments in the present disclosure and features in the embodiments may be randomly combined with each other if there is no conflict.

Unless otherwise defined, technical terms or scientific terms publicly used in the embodiments of the present disclosure should have usual meanings understood by those of ordinary skill in the art to which the present disclosure belongs. "First", "second", and similar terms used in the embodiments of the present disclosure do not represent any order, quantity, or importance, but are only used for distinguishing different components. "Include", "contain", or a similar term means that an element or object appearing before the term covers an element or object and equivalent thereof listed after the term and does not exclude other elements or objects.

Figure 1:
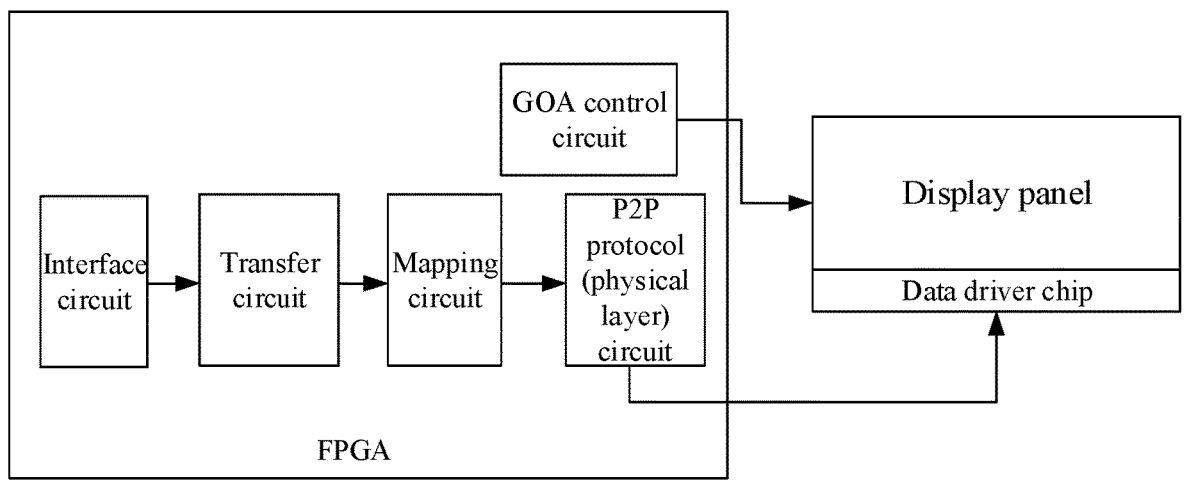
FIG. 1 is a schematic diagram of an exemplary architecture using a FPGA as a display drive control system.
Figure 2:
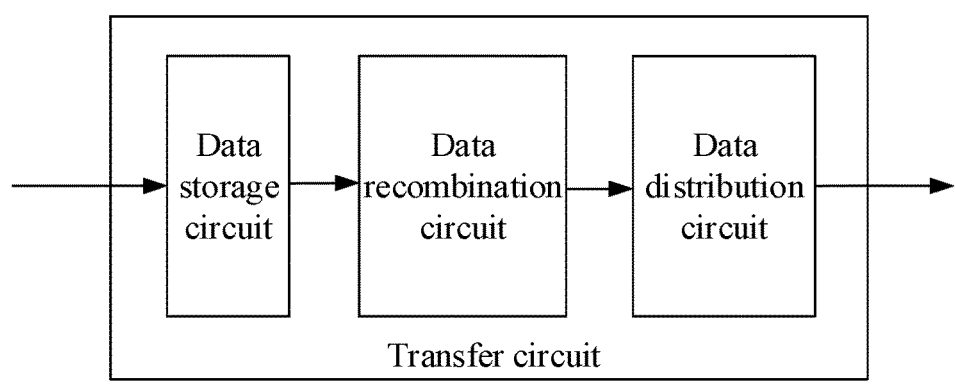
FIG. 2 is a schematic diagram of an implementation scheme of an exemplary transfer circuit.

FIG. 2 is a schematic diagram of an implementation scheme of an exemplary transfer circuit. As shown in FIG. 2, the transfer circuit may include a data storage circuit for buffering data output from an interface circuit, a data recombination circuit for packaging some data, and a data distribution circuit for distributing the packaged data to a plurality of output lanes. For example, if there are M lanes for output of the interface circuit, each lane is a Bit/Lane and the transmission frequency thereof is fa; and if there are N lanes for input of the mapping circuit, each lane is b Bit/Lane and the transmission frequency thereof is fb. In order to keep the total amount of input and output data same, the transfer circuit needs to satisfy the relationship: $M \times a \times fa \times C = N \times b \times fb$, where C may be called clock tick number, which indicates the frequency correspondence between input and output under their respective transmission frequencies, specifically, the total amount of input data for C times may just meet one output. In short, the function of the transfer circuit is to recombine the input data of M lanes at the front end on the premise of ensuring that the data is not lost, and then transmit the data out from N lanes.

In the scheme shown in FIG. 2, M and N must be determined in advance, and only one transfer relationship (for example, "2 to 8") may be realized after the transfer circuit is designed. However, in practical applications, M and N often have to change due to changes of requirements (for example, "4 to 8"). In this case, logic codes must be modified and integrated again to achieve the above purpose, which is equivalent to redesigning a transfer circuit, and the whole process takes a long time and affects the efficiency.

An embodiment of the present disclosure provides a parameterized data transfer method and a device thereof. When the number of lanes of the interface circuit or mapping circuit changes, it only needs to modify the control parameters, omitting the complicated process of modifying the code and comprehensively implementing it, thereby improving the debugging efficiency.

Figure 3:
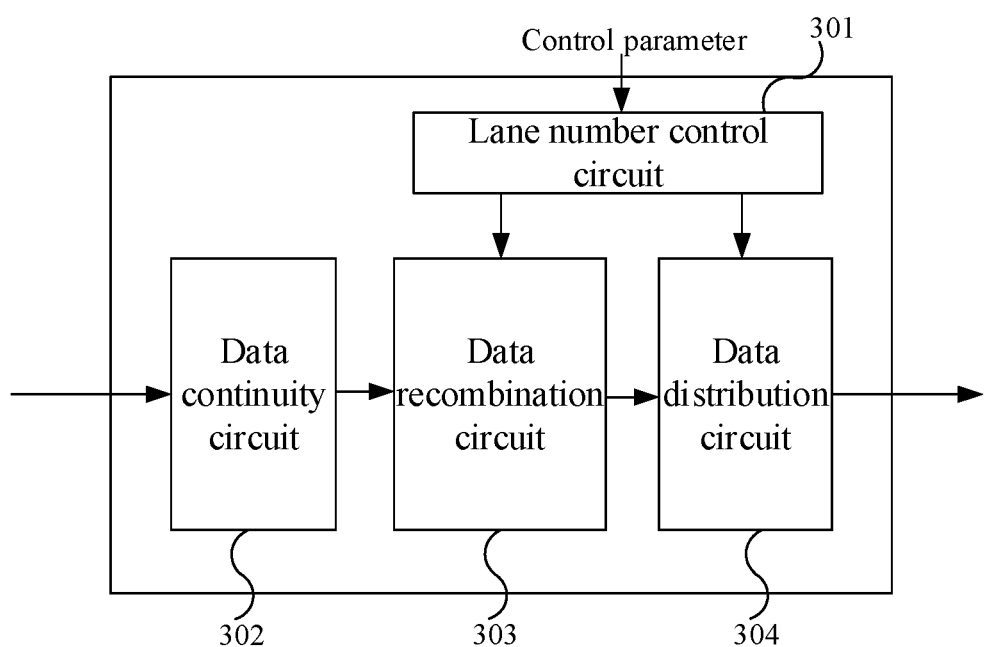
FIG. 3 is a schematic diagram of a structure of a data transfer device according to an embodiment of the present disclosure.

As shown in FIG. 3, an embodiment of the present disclosure provides a data transfer device, including a lane number control circuit 301, a data continuity circuit 302, a data recombination circuit 303, and a data distribution circuit 304.

The lane number control circuit 301 is configured to receive a first input including a number of input lanes and/or a number of output lanes, select a corresponding second-stage memory according to the number of input lanes and/or the number of output lanes, and control a first read signal and a second read signal.

The data continuity circuit 302 includes multiple first-stage memories configured to store data of the input lanes through at least one first-stage memory.

The data distribution circuit 304 includes multiple third-stage memories configured to distribute data of at least one third-stage memory to the output lanes.

The data recombination circuit 303 includes at least one second-stage memory configured to receive the first read signal and the second read signal, wherein data of the first-stage memory is read and written into a corresponding second-stage memory when the first read signal is enabled; and data of the corresponding second-stage memory is read and written into the third-stage memory when the second read signal is enabled.

According to the data transfer device provided by the embodiment of the present disclosure, by selecting the corresponding second-stage memory according to the number of input lanes and/or the number of output lanes, and controlling the first read signal and the second read signal, when the number of input lanes and/or the number of output lanes change, the correct adaptation between the two can be realized only by modifying parameters, without a complicated process of modifying the code and comprehensively implementing it, thereby improving the debugging efficiency. In addition, when the data input by the input lane is discontinuous, the data transfer device according to the embodiment of the present disclosure may make the output data continuously output, thereby reducing the error risk in the data transmission process and simplifying the design of other modules at the back end.

The data transfer device according to the embodiment of the present disclosure may be realized by a Field Programmable Gate Array (FPGA) or an Application Specific Integrated Circuit (ASIC), and may also be realized by other programmable devices, which is not limited by the present disclosure.

The data transfer device according to the embodiment of the present disclosure may be applied to a transfer circuit in a display driver, and may also be applied to any other scene requiring lane transfer, which is not limited by the present disclosure.

The data transfer device according to the embodiment of the present disclosure may be applied to a case where the number of input lanes is variable and the number of output lanes is fixed, may also be applied to a case where the number of input lanes is fixed and the number of output lanes is variable, or to a case where both the number of input lanes and the number of output lanes are variable, which is not limited by the present disclosure.

In some exemplary embodiments, the number of input lanes and/or the number of output lanes input by a user may be realized via Virtual IO (Virtual IO), so that online modification of the number of input lanes and/or the number of output lanes may be realized.

The Virtual IO is an online debugging approach supported by a FPGA chip. The specific implementation may be divided into two acts: in the first act, when FPGA code is designed, it needs to call the virtual IO IP core self-contained in FPGA, and associate the port of virtual IO with the controlled signal in the code; and in the second act, after the code is designed, the code is downloaded to the FPGA chip through an application software of a PC (personal computer) end. After downloading is successful, the designer may assign the port of virtual IO through a software interaction interface.

As shown in FIGS. 4 to 7, Buffer 1 represents a first-stage memory, Buffer 2 represents a second-stage memory, and Buffer 3 represents a third-stage memory. Although the memories in FIGS. 4 to 7 are represented by Buffers, the types of the first-stage memory, the second-stage memory and the third-stage memory are not limited in the embodiments of the present disclosure since the function of the memory (the memory here may be a first-stage memory, a second-stage memory, or a third-stage memory) in the embodiments of the present disclosure is to store data. For example, the first-stage memory, the second-stage memory and the third-stage memory may be buffer memories, or any other type of memories. Embodiments of the present disclosure do not limit the implementation of the first-stage memory, the second-stage memory and the third-stage memory, either. For example, the first-stage memory, the second-stage memory and the third-stage memory may use on-chip resources of FPGA (such as block storage or distributed storage units), or off-chip resources (such as DDR (Double Data Rate SDRAM)).

In some exemplary embodiments, as shown in FIGS. 4 to 7, the number of the first-stage memories Buffer 1 is the same as the maximum input lane number, and each first-stage memory Buffer 1 is connected to one input lane in one-to-one correspondence.

As shown in FIGS. 4 to 7, exemplarily, the maximum input lane number may be 4 and the number of first-stage memories Buffer 1 may be 4, considering that the number of lanes of the existing single DP/HDMI interface is 4. However, the present disclosure is not limited to this.

In some exemplary embodiments, an input bit width (i.e., a bit width of a write port) and an output bit width (i.e., a bit width of a read port) of the first-stage memory Buffer 1 are identical, both equal to the bit width of the input lane to which the first-stage memory Buffer 1 is connected.

As shown in FIGS. 4 to 7, exemplarily, the bit width of the input lane may be 24 bits/lane (bits/Lane), and the input bit width and the output bit width of the first-stage memory Buffer 1 may both be 24 bits. However, the present disclosure is not limited to this. The bit width of the input lane may be set to other bit widths according to actual needs, and the input bit width and the output bit width of the first-stage memory Buffer 1 may also be set to other bit widths according to actual needs.

In addition, the embodiments of the present disclosure are not limited in data formats which may be binary, decimal, hexadecimal and the like, for example.

In some exemplary embodiments, as shown in FIGS. 4 to 7, when a first write signal wr_en1 is active, the data continuity circuit 302 may store the data of the input lane through the at least one first-stage memory Buffer 1. The first write signal wr_en1 may be generated by a previous level device of the data transfer device. Exemplarily, the first write signal wr_en1 may be determined by a data enable (DE) signal of the DP interface or the HDMI interface.

In some exemplary embodiments, as shown in FIGS. 4 to 7, the number of the third-stage memories Buffer 3 is the same as the maximum output lane number, and each third-stage memory Buffer 3 is connected to one output lane in one-to-one correspondence.

As shown in FIGS. 4 to 7, exemplarily, the maximum output lane number may be 8 or 16. However, the present disclosure is not limited to this. For example, the maximum output lane number may be any natural number greater than or equal to 1.

In some exemplary embodiments, an input bit width and an output bit width of the third-stage memory Buffer 3 are identical, and both are equal to the bit width of the output lane to which the third-stage memory Buffer 3 is connected.

As shown in FIGS. 4 to 7, exemplarily, the bit width of the output lane may be 24 bits/lane (bits/Lane), and the input bit width and the output bit width of the third-stage memory Buffer 3 may both be 24 bits. However, the present disclosure is not limited to this. The bit width of the output lane may be set to other bit widths according to actual needs, and the input bit width and the output bit width of the third-stage memory Buffer 3 may also be set to other bit widths according to actual needs.

In this embodiment, the data distribution circuit 304 may also output data at a specified timing in addition to distributing data with a specified number of output lanes. Exemplarily, the specified timing may be Porch timing, which will simplify the design of the back-end mapping circuit.

When the display interface transmits data, there is a certain positional relationship between the active data and a starting signal. This relationship is usually characterized by a set of Porch parameters. Exemplary, Porch parameters include number of horizontal total rows (HTotal), number of horizontal active rows (HActive), horizontal synchronization (HSYNC), horizontal back Porch (HBack Porch, HBP), horizontal front Porch (HFront Porch, HFP), horizontal blanking (HBlanking), end of active video (EAV), start of active video (SAV), number of vertical total rows (VTotal), number of vertical active rows (VActive), vertical front Porch (VFront Porch, VFP), vertical blanking interval (VBI), vertical back Porch (VBack Porch, VBP), vertical blanking (VBlanking), and so on. VBP represents a number of inactive rows after the vertical sync signal at the beginning of a frame of picture, VFP represents a number of inactive rows before the vertical sync signal after the end of a frame of picture, HBP represents a number of clock signals between the start of the horizontal sync signal and the start of the active data of one row, and HFP represents the number of clock signals between the end of the active data of one row and the start of the next horizontal sync signal.

Exemplarily, an implementation of outputting data at a specified timing is as follows: firstly, the recombined data is buffered by a third-stage memory Buffer 3 (exemplarily, the FIFO IP core self-contained in the FPGA may be used), then a third read signal rd_en3 in a specified form is designed, and when the third read signal rd_en3 is enabled, the data of the third-stage memory Buffer 3 is read. That is, the data distribution circuit 304 controls whether the third read signal rd_en3 is enabled to control the timing of the output data.

In the embodiments of the present disclosure, the function of the lane number control circuit 301 is to control writing and reading of the second-stage memory Buffer 2, i.e., to control the first read signal rd_en1 and the second read signal rd_en2. Assuming that both the first read signal rd_en1 and the second read signal rd_en2 are active at high level, when the first read signal rd_en1 is enabled (i.e., at high level), the data of the first-stage memory Buffer 1 is read and written into the corresponding second-stage memory Buffer 2; and when the second read signal rd_en2 is enabled (i.e., at high level), the data of the corresponding second-stage memory Buffer 2 is read and written into the third-stage memory Buffer 3.

In this embodiment, by providing the first-stage memory Buffer 1 and the first read signal rd_en1, the data continuity circuit 302 may not only realize data storage, but also perform a continuity processing on the discontinuous data input from the interface circuit. In some cases, the data output from the interface circuit may be discontinuous, and therefore needs a continuity processing thereon before it is used by the data recombination circuit 303.

Exemplarily, continuity process is implemented as follows: first, discontinuously inputted data is written to the first-stage memory Buffer 1, and only active data is included when written (this process may be called "data buffering"); and then, by designing a first read signal rd_en1, the buffered data is continuously read out.

In an embodiment of the present disclosure, the lane number control circuit 301 may be implemented by a combined timing logic.

In some exemplary implementations, the lane number control circuit 301 may include an input data counter, an output data counter, and a signal generator. The input data counter is configured to perform cyclic counting on the number of data written by the second-stage memory Buffer 2 within a preset time period (e.g., within a line time). The output data counter is configured to perform cyclic counting on the number of data output by the second-stage memory Buffer 2 within a preset time period (e.g., within a line time). The signal generator is configured to set the first read signal rd_en1 to be low (i.e., stop reading data from the first-stage memory Buffer 1) when a difference between the input data count and the output data count is higher than a first highest difference threshold, set the second read signal rd_en2 to be low when a difference between the input data count and the output data count is lower than a second lowest difference threshold, and set the first read signal rd_en1 to be high and the second read signal rd_en2 to be high when a difference between the input data count and the output data count is lower than a preset maximum difference threshold and higher than a preset minimum difference threshold. In this embodiment, the first highest difference threshold and the second lowest difference threshold may be designed according to the number of input lanes and the number of output lanes, the bit width of the input lanes and the bit width of the output lanes.

In some other exemplary embodiments, the lane number control circuit 301 may generate a first read signal rd_en1 and a second read signal rd_en2 according to the empty-full flag signal of the second-stage memory Buffer 2, set the first read signal rd_en1 to be low when the empty-Full flag signal of the second-stage memory Buffer 2 is in a Full state, set the second read signal rd_en2 to be low when the empty-full flag signal of the second-stage memory Buffer 2 is in an Empty state, and set the first read signal rd_en1 to be high and the second read signal rd_en2 to be high when the empty-full flag signal of the second-stage memory Buffer 2 is neither in the full state nor in the empty state. In this embodiment, Buffer 2 may be implemented using the FIFO IP core self-contained in the FPGA, and the FIFO IP core that comes with the FPGA usually has an Empty-Full flag signal (Empty, Full), which may be used as the basis for setting the read-write enable signal to be low.

Figure 4:
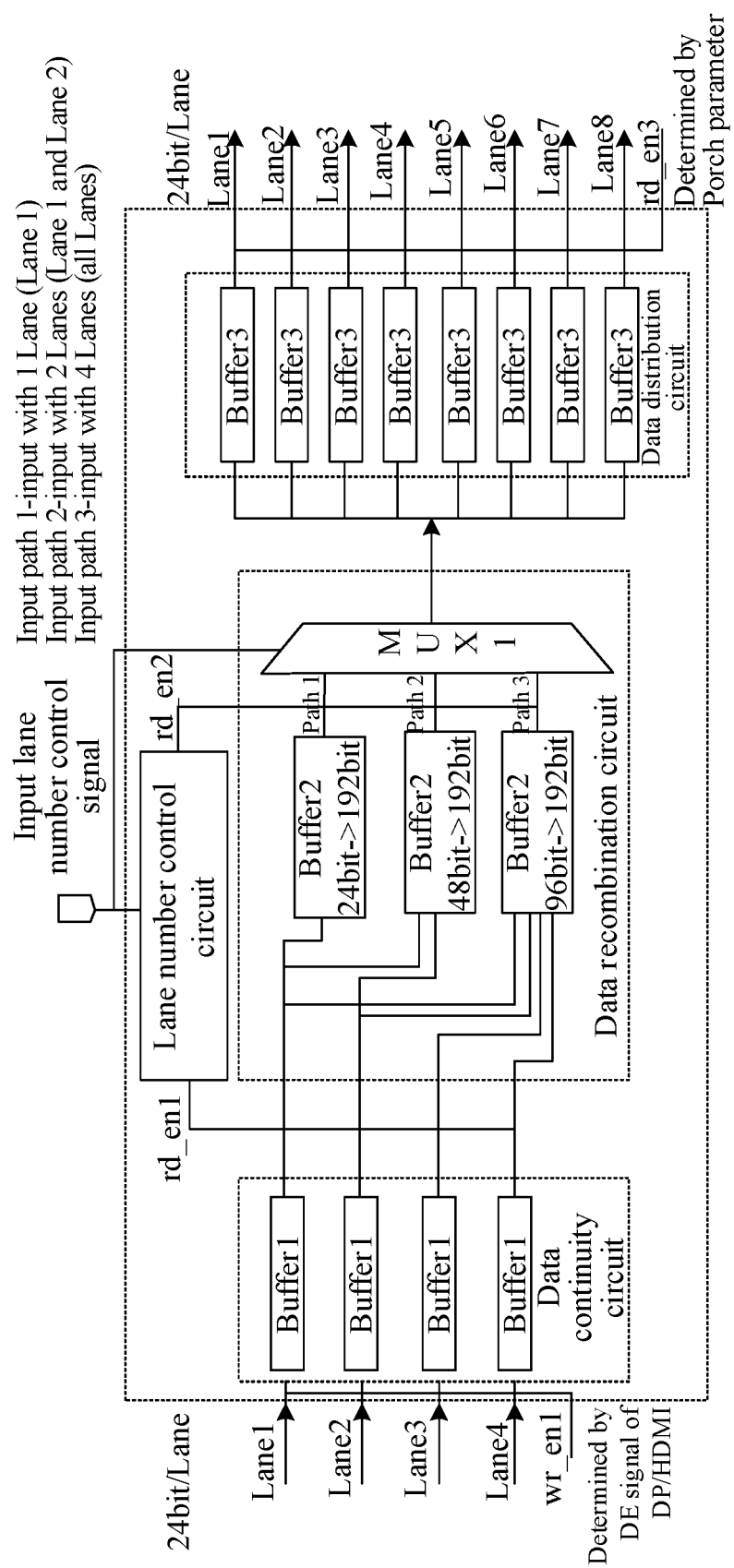
FIGS. 4 to 7 are schematic diagrams of other four structures of a data transfer device according to an exemplary embodiment of the present disclosure.

In some exemplary embodiments, as shown in FIG. 4, the data recombination circuit 303 may further include a first multiplexer MUX1, the number of the second-stage memories Buffer 2 is set according to a number of classes of numbers of input lanes, each second-stage memory Buffer 2 is connected to the first-stage memories Buffer 1 corresponding to the number of input lanes of one class, and the third-stage memory Buffer 3 and the second-stage memory Buffer 2 are connected through the first multiplexer MUX1.

Exemplarily, as shown in FIG. 4, the number of input lanes may be 1, 2 or 4, i.e., the number of classes of numbers of input lanes is 3. Therefore, the number of the second-stage memories Buffer 2 is 3. The first second-stage memory Buffer 2 is connected to one first-stage memory Buffer 1, the second second-stage memory Buffer 2 is connected to two first-stage memories Buffer 1, and the third second-stage memory Buffer 2 is connected to four first-stage memories Buffer 1.

In some exemplary embodiments, the first multiplexer MUX1 selects a corresponding second-stage memory Buffer 2 according to the number of input lanes, and selects one or more corresponding third-stage memories Buffer 3 according to the preset number of output lanes.

Exemplarily, as shown in FIG. 4, when the number of input lanes is 1, the first multiplexer MUX1 selects a corresponding second-stage memory Buffer 2 as the second-stage memory Buffer 2 connected to one first-stage memory Buffer 1 (i.e., the second-stage memory Buffer 2 corresponding to Path 1); when the number of input lanes is 2, the first multiplexer MUX1 selects a corresponding second-stage memory Buffer 2 as the second-stage memory Buffer 2 connected to two first-stage memories Buffer 1 (i.e., the second-stage memory Buffer 2 corresponding to the path 2); and when the number of input lanes is 4, the first multiplexer MUX1 selects a corresponding second-stage memory Buffer 2 as the second-stage memory Buffer 2 connected to four first-stage memories Buffer 1 (i.e., the second-stage memory Buffer 2 corresponding to path 3). Assuming that the preset number of output lanes is 8 (the present disclosure is not limited to this, and it may be other values), the first multiplexer MUX1 selects corresponding third-stage memories Buffer 3 as all the third-stage memories Buffer 3.

In some exemplary embodiments, an input bit width of each second-stage memory Buffer 2 is the same as a total output bit width of one or more first-stage memories Buffer 1 to which the second-stage memory Buffer 2 is connected, and an output bit width of each second-stage memory Buffer 2 is the same as a total output bit width of one or more third-stage memories Buffer 3 to which the second-stage memory Buffer 2 is connected.

Exemplarily, as shown in FIG. 4, as for the second-stage memory Buffer 2 corresponding to Path 1, the number of the first-stage memories Buffer 1 connected thereto is 8, and the input bit width is 24 bits; and the number of the third-stage memories Buffer 3 connected thereto is 8, and the output bit width is 192 bits; as for the second-stage memory Buffer 2 corresponding to Path 2, the number of the first-stage memories Buffer 1 connected thereto is 2, and the input bit width is 48 bits; and the number of the third-stage memories Buffer 3 connected thereto is 8, and the output bit width is 192 bits; as for the second-stage memory Buffer 2 corresponding to Path 3, the number of the first-stage memories Buffer 1 connected thereto is 4, and the input bit width of 96 bits; and the number of the third-stage memories Buffer 3 connected thereto is 8, and the output bit width is 192 bits.

In the data transfer device shown in FIG. 4, the number of input lanes may be set by a parameter, and the number of output lanes is fixed. According to the scheme in FIG. 4, it may be realized that the number of input lanes is set by a parameter, and the number of output lanes is fixed to be 8. In this scheme, different paths are selected by multiplexer in a data recombination stage (wherein the data sources of Path 1/Path 2/Path 3 are 1 lane/2 lanes/4 lanes, respectively). The multiplexer is controlled by the input lane number control signal that is input externally. The maximum input lane number and the maximum output lane number in FIG. 4 are 4 and 8, respectively, which may be designed as other values according to actual use.

Figure 5:
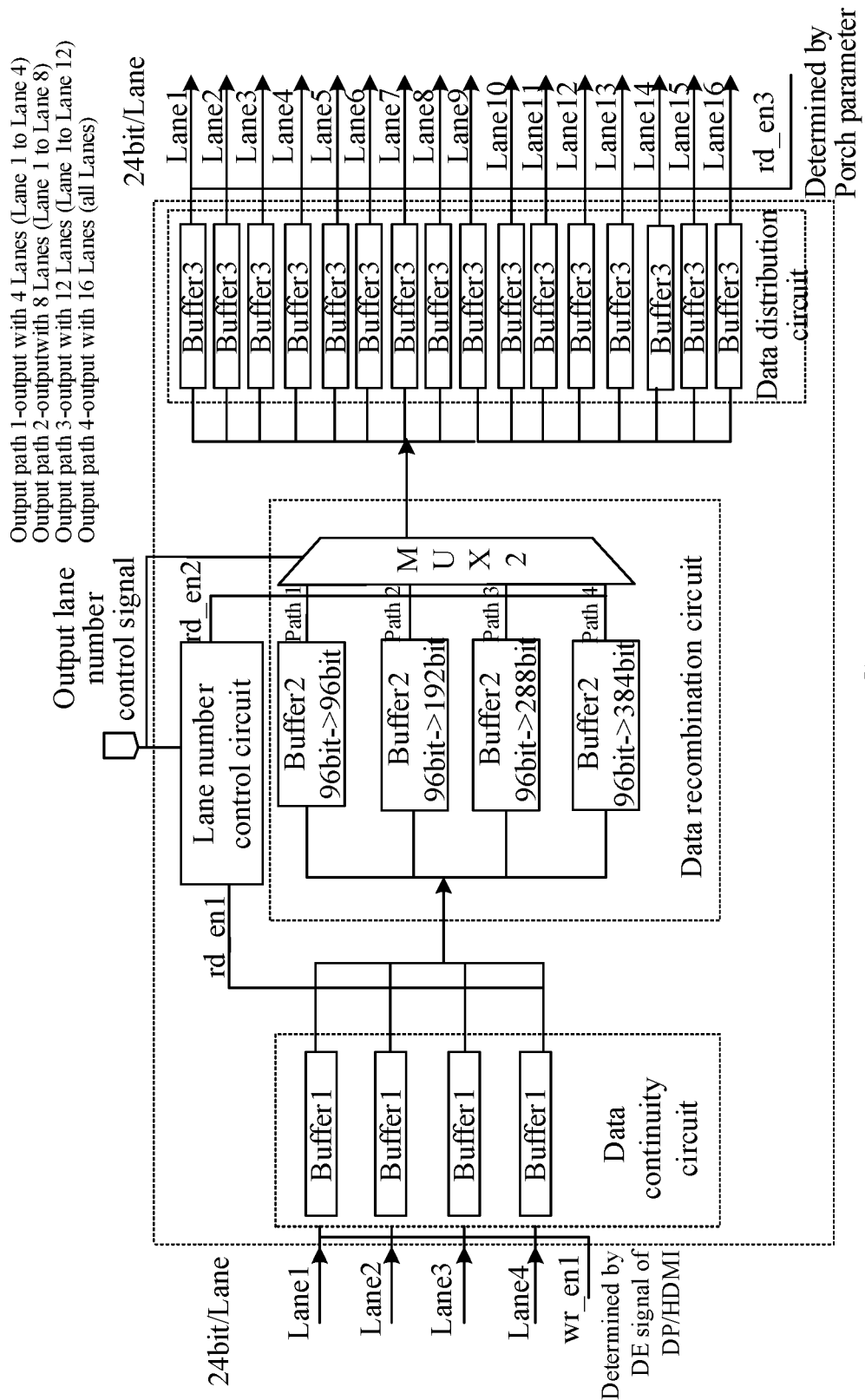

In some exemplary embodiments, as shown in FIG. 5, the data recombination circuit 303 may further include a second multiplexer MUX2, the number of the second-stage memories Buffer 2 is set according to a number of classes of numbers of output lanes, and each second-stage memory Buffer 2 is connected to the third-stage memories Buffer 3 corresponding to the number of output lanes of one class through the second multiplexer MUX2.

Exemplarily, as shown in FIG. 5, the number of output lanes may be 4, 8, 12, or 16, that is, the number of classes of numbers of output lanes is 4. Therefore, the number of the second-stage memories Buffer 2 is four. The first second-stage memory Buffer 2 is connected to four third-stage memories Buffer 3, the second second-stage memory Buffer 2 is connected to eight third-stage memories Buffer 3, the third second-stage memory Buffer 2 is connected to twelve third-stage memories Buffer 3, and the fourth second-stage memory Buffer 2 is connected to sixteen third-stage memories Buffer 3.

In some exemplary embodiments, the second multiplexer MUX2 selects multiple corresponding third-stage memories Buffer 3 to connect with one second-stage memory Buffer 2 based on the number of output lanes.

Exemplarily, as shown in FIG. 5, when the number of output lanes is 4, the second multiplexer MUX2 selects multiple corresponding third-stage memories Buffer 3 and one second-stage memory Buffer 2 as four third-stage memories Buffer 3 and corresponding second-stage memory Buffer 2 connected to the four third-stage memories Buffer 3 (i.e., the second-stage memory Buffer 2 corresponding to Path 1); when the number of output lanes is 8, the second multiplexer MUX2 selects multiple corresponding third-stage memories Buffer 3 and one second-stage memory Buffer 2 as eight third-stage memories Buffer 3 and corresponding second-stage memory Buffer 2 connected to the eight third-stage memories Buffer 3 (i.e., the second-stage memory Buffer 2 corresponding to Path 2); when the number of output lanes is 12, the second multiplexer MUX2 selects multiple corresponding third-stage memories Buffer 3 and one second-stage memory Buffer 2 as twelve third-stage memories Buffer 3 and corresponding second-stage memory Buffer 2 connected to the twelve third-stage memories Buffer 3 (i.e., the second-stage memories Buffer 2 corresponding to Path 3); when the number of output lanes is 16, the second multiplexer MUX2 selects multiple corresponding third-stage memories Buffer 3 and one second-stage memory Buffer 2 as sixteen third-stage memories Buffer 3 and corresponding second-stage memory Buffer 2 connected to the sixteen third-stage memories Buffer 3 (i.e., the second-stage memory Buffer 2 corresponding to Path 4). Assuming that the preset number of input lanes is 4 (the present disclosure is not limited to this, and it may be other values), each second-stage memory Buffer 2 is connected to all first-stage memories Buffer 1.

In some exemplary embodiments, an input bit width of each second-stage memory Buffer 2 is the same as a total output bit width of one or more first-stage memories Buffer 1 to which the second-stage memory Buffer 2 is connected, and an output bit width of each second-stage memory Buffer 2 is the same as a total output bit width of one or more third-stage memories Buffer 3 to which the second-stage memory Buffer 2 is connected.

Exemplarily, as shown in FIG. 5, as for the second-stage memory Buffer 2 corresponding to Path 1, the number of the first-stage memories Buffer 1 connected thereto is 4, and the input bit width is 24 bits; and the number of the third-stage memories Buffer 3 connected thereto is 4, and the output bit width is 96 bits. As for the second-stage memory Buffer 2 corresponding to Path 2, the number of the first-stage memories Buffer 1 connected thereto is 4, and the input bit width is 96 bits; and the number of the third-stage memories Buffer 3 connected thereto is 8, and the output bit width is 192 bit. As for the second-stage memory Buffer 2 corresponding to Path 3, the number of the first-stage memories Buffer 1 connected thereto is 4, and the input bit width is 96 bits; and the number of the third-stage memories Buffer 3 connected thereto is 12, and the output bit width is 288 bits. As for the second-stage memory Buffer 2 corresponding to Path 4, the number of the first-stage memories Buffer 1 connected thereto is 4, and the input bit width is 96 bits; and the number of the third-stage memories Buffer 3 connected thereto is 16, and the output bit width is 384 bits.

In the data transfer device shown in FIG. 5, the number of input lanes is fixed and the number of output lanes may be set by a parameter. According to the scheme in FIG. 5, it may be realized that the number of input lanes is fixed as 4, and the number of output lanes may be set (as 4/8/12/16) by a parameter. In this scheme, different paths are selected by multiplexer in the data reorganization stage (wherein the output paths of Path 1/Path 2/Path 3/Path 4 correspond to 4 lanes/8 lanes/12 lanes/16 lanes, respectively). The multiplexer is controlled by the output lane number control signal that is input externally. The maximum input lane number and the maximum output lane number in FIG. 5 are 4 and 16, respectively, which may be designed as other values according to actual use.

Figure 6:
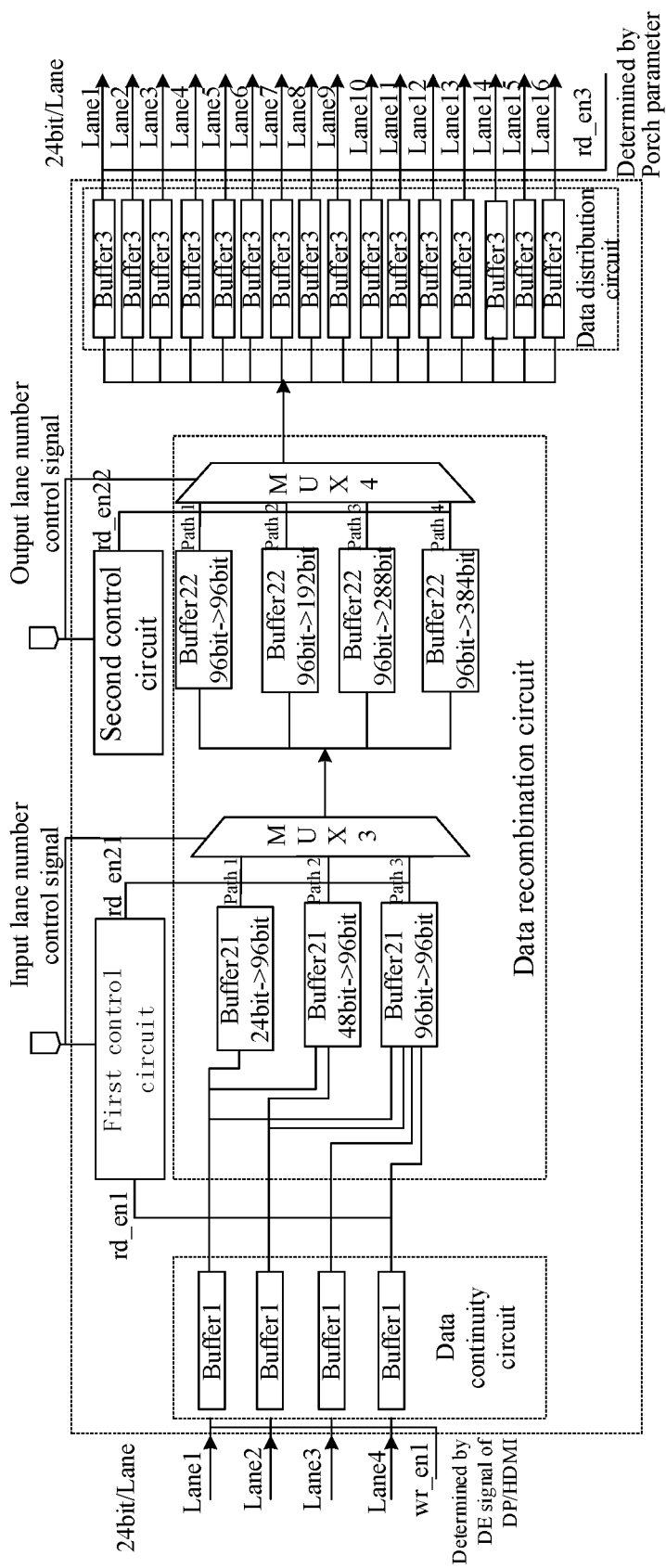

In some exemplary embodiments, as shown in FIG. 6, the data recombination circuit 303 includes a third multiplexer MUX3 and a fourth multiplexer MUX4. The second-stage memory Buffer 2 includes a first sub-second-stage memory Buffer 21 and a second sub-second-stage memory Buffer 22. The number of the first sub-second-stage memories Buffer 21 is set according to the number of classes of numbers of input lanes, and each first sub-second-stage memory Buffer 21 is connected to the first-stage memories Buffer 1 corresponding to the number of input lanes of one class. The number of the second sub-second-stage memory Buffer 22 is set according to the number of classes of numbers of output lanes, and the second sub-second-stage memory Buffer 22 is connected to the first sub-second-stage memory Buffer 21 through the third multiplexer MUX3. The third-stage memory Buffer 3 is connected to the second sub-second-stage memory Buffer 22 through the fourth multiplexer MUX4. The third multiplexer MUX3 selects the first sub-second-stage memory Buffer 21 connected to the second sub-second-stage memory Buffer 22 according to the number of input lanes, and the fourth multiplexer MUX4 selects the second sub-second-stage memory Buffer 22 connected to the third-stage memory Buffer 3 according to the number of output lanes.

Exemplarily, as shown in FIG. 6, when the number of input lanes is 1, the first sub-second-stage memory Buffer 21 selected by the third multiplexer MUX3 is the first sub-second-stage memory Buffer 21 connected to one first-stage memory Buffer 1 (i.e., the first sub-second-stage memory Buffer 21 corresponding to the input path 1). When the number of input lanes is 2, the first sub-second-stage memory Buffer 21 selected by the third multiplexer MUX3 is the first sub-second-stage memory Buffer 21 connected to two first-stage memories Buffer 1 (i.e., the first sub-second-stage memory Buffer 21 corresponding to the input path 2). When the number of input lanes is 4, the first sub-second-stage memory Buffer 21 selected by the third multiplexer MUX3 is the first sub-second-stage memory Buffer 21 connected to four first-stage memories Buffer 1 (i.e., the first sub-second-stage memory Buffer 21 corresponding to the input path 3).

As shown in FIG. 6, when the number of output lanes is 4, the second sub-second-stage memory Buffer 22 selected by the fourth multiplexer MUX4 is the second sub-second-stage memory Buffer 22 connected to four third-stage memories Buffer 3 (i.e., the second sub-second-stage memory Buffer 22 corresponding to the output path 1). When the number of output lanes is 8, the second sub-second-stage memory Buffer 22 selected by the fourth multiplexer MUX4 is the second sub-second-stage memory Buffer 22 connected to eight third-stage memories Buffer 3 (i.e., the second sub-second-stage memory Buffer 22 corresponding to the output path 2). When the number of output lanes is 12, the second sub-second-stage memory Buffer 22 selected by the fourth multiplexer MUX4 is the second sub-second-stage memory Buffer 22 connected to twelve third-stage memories Buffer 3 (i.e., the second sub-second-stage memory Buffer 22 corresponding to the output path 3). When the number of output lanes is 16, the second sub-second-stage memory Buffer 22 selected by the fourth multiplexer MUX4 is the second sub-second-stage memory Buffer 22 connected to sixteen third-stage memories Buffer 3 (i.e., the second sub-second-stage memory Buffer 22 corresponding to the output path 4).

In some exemplary embodiments, as shown in FIG. 6, the lane number control circuit 301 includes a first control circuit configured to control the first read signal rd_en1 and the first sub-second read signal rd_en21 according to the number of input lanes, and a second control circuit configured to control the second sub-second read signal rd_en22 according to the number of output lanes.

In an embodiment of the present disclosure, the function of the first control circuit is to control writing and reading of the first sub-second-stage memory Buffer 21, i.e., to control the first read signal rd_en1 and the first sub-second read signal rd_en21. Assuming that both the first read signal rd_en1 and the first sub-second read signal rd_en21 are active at high level, when the first read signal rd_en1 is enabled (i.e., at high level), the data of the first-stage memory Buffer 1 is read and written into the corresponding first sub-second-stage memory Buffer 21; and when the first sub-second read signal rd_en21 is enabled (i.e. at high level), the data of the corresponding first sub-second-stage memory Buffer 21 is read and written to the corresponding second sub-second-stage memory Buffer 22.

In an embodiment of the present disclosure, the function of the second control circuit is to control the read of the second sub-second-stage memory Buffer 22, i.e., to control the second sub-second read signal rd_en22. Assuming that the second sub-second read signal rd_en22 is active at high level, when the second sub-second read signal rd_en22 is enabled (i.e., at high level), the data of the second sub-second-stage memory Buffer 22 is read and written into the corresponding third-stage memory Buffer 3.

In an embodiment of the present disclosure, the first control circuit and the second control circuit may be implemented by a combined timing logic, respectively. The specific implementation method may be referred to the implementation method of the lane number control circuit 301 described above, which will not be described repeatedly here.

In some exemplary embodiments, an input bit width of each first sub-second-stage memory Buffer 21 is the same as a total output bit width of one or more first-stage memories Buffer 1 to which the first sub-second-stage memory Buffer 21 is connected, an output bit width of each first sub-second-stage memory Buffer 21 is the same as a total bit width of the output lanes corresponding to a preset minimum output lane number, an input bit width of each second sub-second-stage memory Buffer 22 is the same as a total bit width of the output lanes corresponding to a preset minimum output lane number, and an output bit width of each second sub-second-stage memory Buffer 22 is the same as a total input bit width of one or more third-stage memories Buffer 3 to which the second sub-second-stage memory Buffer 22 is connected.

Exemplarily, as shown in FIG. 6, as for the first sub-second-stage memory Buffer 21 corresponding to the input path 1, the number of the first-stage memories Buffer 1 connected thereto is 1, the input bit width is 24 bits, the minimum output lane number is 4, and the output bit width is 96 bits. As for the first sub-second-stage memory Buffer 21 corresponding to the input path 2, the number of the first-stage memories Buffer 1 connected thereto is 2, the input bit width is 48 bits, the minimum output lane number is 4, and the output bit width is 96 bits. As for the first sub-second-stage memory Buffer 21 corresponding to the input path 3, the number of the first-stage memories Buffer 1 connected thereto is 4, the input bit width is 96 bits, the minimum output lane number is 4, and the output bit width is 96 bits.

As shown in FIG. 6, as for the second sub-second-stage memory Buffer 22 corresponding to the output path 1, the minimum output lane number is 4, the input bit width is 96 bits, the number of the third-stage memories Buffer 3 connected thereto is 4, and the output bit width is 96 bits. As for the second sub-second-stage memory Buffer 22 corresponding to the output path 2, the minimum output lane number is 4, the input bit width is 96 bits, the number of the third-stage memories Buffer 3 connected thereto is 8, and the output bit width is 192 bits. As for the second sub-second-stage memory Buffer 22 corresponding to the output path 3, the minimum output lane number is 4, the input bit width is 96 bits, the number of the third-stage memories Buffer 3 connected thereto is 12, and the output bit width is 288 bits. As for the second sub-second-stage memory Buffer 22 corresponding to the output path 4, the minimum output lane number is 4, the input bit width is 96 bits, the number of the third-stage memories Buffer 3 connected thereto is 16, and the output bit width is 384 bits.

According to the scheme shown in FIG. 6, it may be realized that the input lane is set by a parameter (1/2/4 lanes), the output lane is set by a parameter (16/12/8/4 lanes), and the numbers of input and output lanes are controlled by two signals (input lane number control signal and output lane number control signal), respectively. Output Path 1/Path 2/Path 3/Path 4 correspond to the output of 4 lanes (Lanes 1 to 4)/8 lanes (Lanes 1 to 8)/12 lanes (Lanes 1 to 12)/16 lanes (Lanes 1 to 16), respectively. When the number of output lanes is less than 16, the output of other inactive lanes may be set as 24'h0 (24'h0 means 0 of 24 bits in hexadecimal). In FIG. 6, the maximum input lane number and the maximum output lane number are 4 and 16, respectively, which may also be designed as other values according to actual use.

In some exemplary embodiments, the data recombination circuit 303 further includes an input and output selection circuit, one second-stage memory is included, an input bit width of the second-stage memory is equal to a sum of bit widths of all the input lanes, and an output bit width of the second-stage memory is equal to a sum of bit widths of all the output lanes.

The input and output selection circuit is configured to select active data in the second-stage memory according to the number of input lanes and/or the number of output lanes, and distribute the selected active data to corresponding output lanes.

Figure 7:
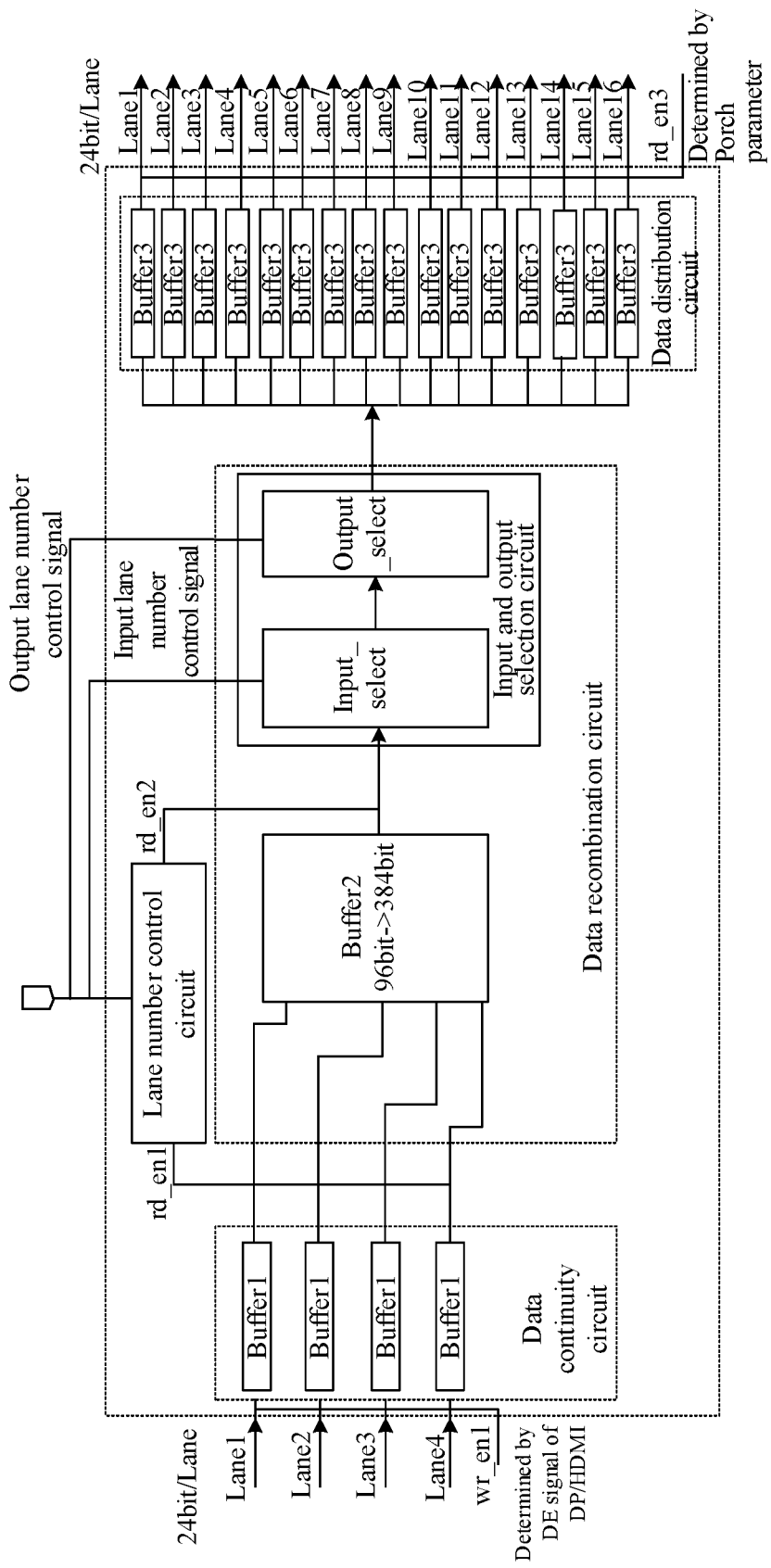

As shown in FIG. 7, the sum of the bit widths of all input lanes is 96 bits, the input bit width of the second-stage memory Buffer 2 is 96 bits, the sum of the bit widths of all output lanes is 384 bits, and the output bit width of the second-stage memory Buffer 2 is 384 bits.

In some exemplary embodiments, when the number of input lanes is fixed and the number of output lanes is variable, the input and output selection circuit may regard all the data in the second-stage memory as active data and distribute the active data to the corresponding output lanes according to the number of output lanes; and when the number of input lanes is variable and the number of output lanes is fixed, the input and output selection circuit may select the active data in the second-stage memory according to the number of input lanes and distribute the selected active data to all the output lanes.

In some exemplary embodiments, when the number of input lanes is variable and the number of output lanes is variable, the input and output selection circuit includes an input selection (Input_select) circuit and an output selection (Output_select) circuit.

The input selection circuit is configured to select active data in the second-stage memory according to the number of input lanes; and the output selection circuit is configured to distribute the selected active data to corresponding output lanes according to the number of output lanes.

Both the input selection circuit and the output selection circuit in the embodiment of the present disclosure may be implemented based on a finite state machine (FSM). The key to the FSM is to clarify what conditions there are and what the outputs are under these conditions.

Taking the input selection circuit as an example, the number of input lanes may be used as the condition of the FSM of the input selection circuit. For example, the following logic may be designed: when the number of input lanes is 1, 96 bits of the 384 bits of output data of the FSM of the input selection circuit are active data; when the number of input lanes is 2, 192 bits of the 384 bits of output data of the FSM of the input selection circuit are active data; and when the number of input lanes is 4, all the 384 bits of output data of the FSM of the input selection circuit are active data.

After knowing which bits in the 384 bits of output data of the FSM of the input selection circuit are active data, the output selection circuit may also use the FSM to design a similar logic.

When the number of output lanes is 1, the first 24 bits of the 384 bits of output data of the FSM of the output selection circuit are active data; when the number of output lanes is 2, the first 48 bits of the 384 bits of output data of the FSM of the output selection circuit are active data; when the number of output lanes is 4, the first 96 bits of the 384 bits of output data of the FSM of the output selection circuit are active data; and so on, when the number of output lanes is 16, all 384 bits of output data of the FSM of the output selection circuit are active data.

The implementation concept of the data transfer device shown in FIGS. 4 to 6 is intuitive, but it uses more storage units and occupies a large amount of resources. According to the data transfer device shown in FIG. 7, the input and output selection circuit is implemented using a combined timing logic, and relatively less storage resources are occupied. The function of the input and output selection circuit may be realized in several ways, which is not limited in the present disclosure.

In some exemplary embodiments, the user's first input may include at least one of the following: one or more specified input lanes, and one or more specified output lanes, in addition to the number of input lanes and/or the number of output lanes. Exemplarily, when the user specifies two input lanes and specifies the input lanes to be Lanes 3 to 4, the user-specified Lanes 3 to 4 are used as the input lanes, and when the user merely specifies two input lanes but does not specify which input lanes to use, the default Lanes 1 to 2 are used as the input lanes. Similarly, when the user specifies 8 output lanes and specifies the output lanes to be Lanes 9 to 16, the user-specified Lanes 9 to 16 are used as the output lanes, and when the user merely specifies 8 output lanes but does not specify which output lanes to use, the default Lanes 1 to 8 are used as the output lanes.

Figure 8:
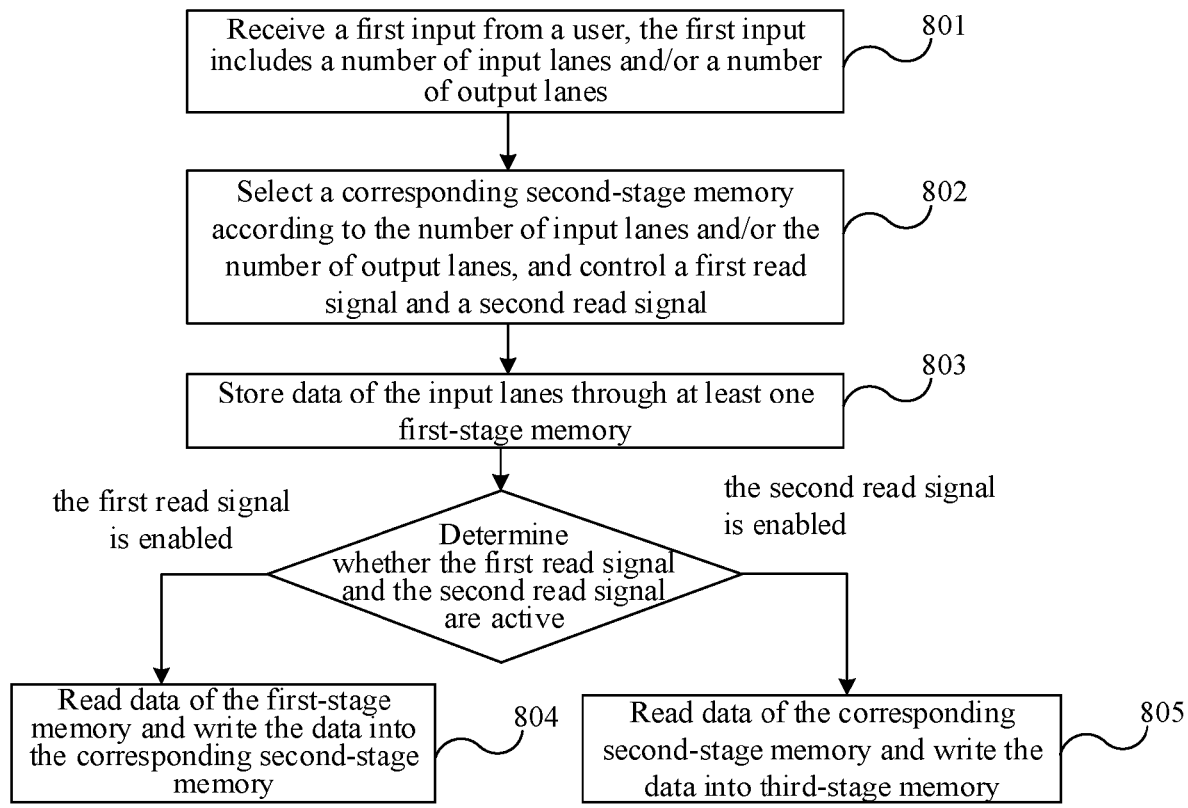
FIG. 8 is a schematic diagram of a flowchart of a data transfer method according to an exemplary embodiment of the present disclosure.

As shown in FIG. 8, an embodiment of the present disclosure further provides a data transfer method, including the following acts 801 to 805.

In act 801, a first input is received, and the first input includes the number of input lanes and/or the number of output lanes.

In act 802, a corresponding second-stage memory is selected according to the number of input lanes and/or the number of output lanes, and a first read signal and a second read signal are controlled.

In act 803, data of the input lanes are stored through at least one first-stage memory.

In act 804, data of the first-stage memory is read and written into a corresponding second-stage memory when the first read signal is enabled.

In act 805, data of the corresponding second-stage memory is read and written into the third-stage memory when the second read signal is enabled.

According to the data transfer method of the embodiment of the present disclosure, by selecting the corresponding second-stage memory according to the number of input lanes and/or the number of output lanes, and controlling the first read signal and the second read signal, when the number of input lanes and/or the number of output lanes changes, the correct adaptation between the two can be realized only by modifying parameters, without a complicated process of modifying the code and comprehensively implementing it, thereby improving the debugging efficiency. In addition, when the data input by the input lane is discontinuous, the data transfer method according to the embodiment of the present disclosure may make the output data continuously output, thereby reducing the error risk in the data transmission process and simplifying the design of other circuits at the back end.

The data transfer method according to the embodiment of the present disclosure may be realized by a Field Programmable Gate Array (FPGA) or an Application Specific Integrated Circuit (ASIC), and may also be realized by other programmable devices, which is not limited by the present disclosure.

The data transfer method according to the embodiment of the present disclosure may be used for a transfer circuit in a display driver, and may also be used for other scenes requiring lane transfer, which is not limited by the present disclosure.

In some exemplary embodiments, the number of input lanes and/or the number of output lanes input by a user may be realized via Virtual IO (Virtual IO), so that online modification of the number of input lanes and/or the number of output lanes may be realized.

In some exemplary embodiments, the number of first-stage memories is the same as the maximum input lane number, and each of the first-stage memories is arranged in one-to-one correspondence with one of the input lanes.

As shown in FIGS. 4 to 7, exemplarily, the maximum input lane number may be 4, considering that the number of lanes of the existing single DP/HDMI interface is 4. However, the present disclosure is not limited to this.

In the embodiment, the input bit width and the output bit width of the first-stage memory are identical, and both are equal to the bit width of the input lane to which the first-stage memory is connected.

As shown in FIGS. 4 to 7, exemplarily, the bit width of the input lane may be 24 bits/Lane, and the input bit width and the output bit width of the first-stage memory Buffer 1 may both be 24 bits. However, the present disclosure is not limited to this. The bit width of the input lane may be set to other bit widths according to actual needs, and the input bit width and the output bit width of the first-stage memory Buffer 1 may also be set to other bit widths according to actual needs.

In some exemplary embodiments, as shown in FIGS. 4 to 7, when a first write signal wr_en1 is active, the data of the input lane is stored through at least one first-stage memory Buffer 1. The first write signal wr_en1 may be generated by a previous level device of the data transfer device. Exemplarily, the first write signal wr_en1 may be determined by a data enable (DE) signal of the DP interface or the HDMI interface.

In some exemplary embodiments, the number of third-stage memories is the same as the maximum output lane number, and each of the third-stage memories is arranged in one-to-one correspondence with one of the output lanes.

As shown in FIGS. 4 to 7, exemplarily, the maximum output lane number may be 8 or 16. However, the present disclosure is not limited to this. For example, the maximum output lane number may be any natural number greater than or equal to 1.

In this embodiment, the input bit width and the output bit width of the third-stage memory are identical, and both are equal to the bit width of the output lane to which the third-stage memory is connected.

As shown in FIGS. 4 to 7, exemplarily, the bit width of the output lane may be 24 bits/lane (bits/Lane), and the input bit width and the output bit width of the third-stage memory may both be 24 bits. However, the present disclosure is not limited to this. The bit width of the output lane may be set to other bit widths according to actual needs, and the input bit width and the output bit width of the third-stage memory may also be set to other bit widths according to actual needs.

In some exemplary embodiments, the method further includes: controlling a third read signal according to a preset timing; and reading data of the third-stage memory and distributing the data into a corresponding output lane when the third read signal is enabled.

Exemplarily, the specified timing may be Porch timing, which will simplify the design of the back-end mapping circuit.

In some exemplary embodiments, the number of the second-stage memories is set according to a number of classes of numbers of input lanes, and each of the second-stage memories is connected to the first-stage memories corresponding to the number of input lanes of one class.

The action of selecting the corresponding second-stage memory according to the number of input lanes and/or the number of output lanes includes: selecting one corresponding second-stage memory according to the number of input lanes, and selecting multiple corresponding third-stage memories according to a preset number of output lanes.

Exemplarily, as shown in FIG. 4, the number of input lanes may be 1, 2 or 4, i.e., the number of classes of numbers of input lanes is 3. Therefore, the number of the second-stage memories Buffer 2 is 3. The first second-stage memory is connected to one first-stage memory Buffer 1, the second second-stage memory Buffer 2 is connected to two first-stage memories Buffer 1, and the third second-stage memory Buffer 2 is connected to four first-stage memories Buffer 1. When the number of input lanes is 1, a corresponding second-stage memory Buffer 2 is selected as the second-stage memory Buffer 2 connected to one first-stage memory Buffer 1 (i.e., the second-stage memory Buffer 2 corresponding to Path 1); when the number of input lanes is 2, a corresponding second-stage memory Buffer 2 is selected as the second-stage memory Buffer 2 connected to two first-stage memories Buffer 1 (i.e., the second-stage memory Buffer 2 corresponding to Path 2); and when the number of input lanes is 4, a corresponding second-stage memory Buffer 2 is selected as the second-stage memory Buffer 2 connected to four first-stage memories Buffer 1 (i.e., the second-stage memory Buffer 2 corresponding to Path 3).

Assuming that the preset number of output lanes is 8 (the present disclosure is not limited to this, and it may be other values), corresponding third-stage memories Buffer 3 are selected as all the third-stage memories Buffer 3.

In some exemplary embodiments, an input bit width of each second-stage memory is the same as a total output bit width of one or more first-stage memories to which the second-stage memory is connected, and an output bit width of each second-stage memory is the same as a total output bit width of one or more third-stage memories to which the second-stage memory is connected.

Exemplarily, as shown in FIG. 4, as for the second-stage memory Buffer 2 corresponding to Path 1, the number of the first-stage memories Buffer 1 connected thereto is 1, and the input bit width is 24 bits; and the number of the third-stage memories Buffer 3 connected thereto is 8, and the output bit width is 192 bits. As for the second-stage memory Buffer 2 corresponding to Path 2, the number of the first-stage memories Buffer 1 connected thereto is 2, and the input bit width is 48 bits; and the number of the third-stage memories Buffer 3 connected thereto is 8, and the output bit width is 192 bits. As for the second-stage memory Buffer 2 corresponding to Path 3, the number of the first-stage memories Buffer 1 connected thereto is 4, and the input bit width is 96 bits; and the number of the third-stage memories Buffer 3 connected thereto is 8, and the output bit width is 192 bits.

As shown in FIG. 5, as for the second-stage memory Buffer 2 corresponding to Path 1, the number of the first-stage memories Buffer 1 connected thereto is 4, the input bit width is 96 bits, the number of the third-stage memories Buffer 3 connected thereto is 4, and the output bit width is 96 bits. As for the second-stage memory Buffer 2 corresponding to Path 2, the number of the first-stage memories Buffer 1 connected thereto is 4, the input bit width is 96 bits, the number of the third-stage memories Buffer 3 connected thereto is 8, and the output bit width is 192 bits. As for the second-stage memory Buffer 2 corresponding to Path 3, the number of the first-stage memories Buffer 1 connected thereto is 4, the input bit width is 96 bits, the number of the third-stage memories Buffer 3 connected thereto is 12, and the output bit width is 288 bits. As for the second-stage memory Buffer 2 corresponding to Path 4, the number of the first-stage memories Buffer 1 connected thereto is 4, the input bit width is 96 bits, the number of the third-stage memories Buffer 3 connected thereto is 16, and the output bit width is 384 bits.

In some other exemplary embodiments, the number of the second-stage memories is set according to a number of classes of numbers of output lanes, and each of the second-stage memories is connected to the third-stage memories corresponding to the number of input lanes of one class.

The action of selecting the corresponding second-stage memory according to the number of input lanes and/or the number of output lanes includes: selecting multiple corresponding third-stage memories and one second-stage memory according to the number of output lanes.

Exemplarily, as shown in FIG. 5, the number of output lanes may be 4, 8, 12, or 16, that is, the number of classes of numbers of output lanes is 4. Therefore, the number of the second-stage memories Buffer 2 is four. The first second-stage memory Buffer 2 is connected to four third-stage memories Buffer 3, the second second-stage memory Buffer 2 is connected to eight third-stage memories Buffer 3, the third second-stage memory Buffer 2 is connected to twelve third-stage memories Buffer 3, and the fourth second-stage memory Buffer 2 is connected to sixteen third-stage memories Buffer 3.

As shown in FIG. 5, when the number of output lanes is 4, multiple corresponding third-stage memories Buffer 3 and one second-stage memory Buffer 2 are selected as four third-stage memories Buffer 3 and the corresponding second-stage memory Buffer 2 connected to the four third-stage memories Buffer 3 (i.e., the second-stage memory Buffer 2 corresponding to Path 1). When the number of output lanes is 8, multiple corresponding third-stage memories Buffer 3 and one second-stage memory Buffer 2 are selected as eight third-stage memories Buffer 3 and the corresponding second-stage memory Buffer 2 connected to the eight third-stage memories Buffer 3 (i.e., the second-stage memory Buffer 2 corresponding to Path 2). When the number of output lanes is 12, multiple corresponding third-stage memories Buffer 3 and one second-stage memory Buffer 2 are selected as twelve third-stage memories Buffer 3 and the corresponding second-stage memory Buffer 2 connected to the twelve third-stage memories Buffer 3 (i.e., the second-stage memory Buffer 2 corresponding to Path 3). When the number of output lanes is 16, multiple corresponding third-stage memories Buffer 3 and one second-stage memory Buffer 2 are selected as sixteen third-stage memories Buffer 3 and the corresponding second-stage memory Buffer 2 connected to the sixteen third-stage memories Buffer 3 (i.e., the second-stage memory Buffer 2 corresponding to Path 4). Assuming that the preset number of input lanes is 4 (the present disclosure is not limited to this, and it may be other values), each second-stage memory Buffer 2 is connected to all first-stage memories Buffer 1.

In still some exemplary embodiments, the second-stage memory includes a first sub-second-stage memory and a second sub-second-stage memory, the number of the first sub-second-stage memories is set according to the number of classes of numbers of input lanes, each of the first sub-second-stage memories is connected to the first-stage memories corresponding to the number of input lanes of one class, the number of the second sub-second-stage memories is set according to the number of classes of numbers of output lanes, and each second sub-second-stage memory is connected to the third-stage memories corresponding to the number of output lanes of one class.

The action of selecting the corresponding second-stage memory according to the number of input lanes and/or the number of output lanes includes: selecting a corresponding first sub-second-stage memory according to the number of input lanes, and selecting a corresponding second sub-second-stage memory and a third-stage memory according to the number of output lanes.

Exemplarily, as shown in FIG. 6, when the number of input lanes is 1, the selected first sub-second-stage memory Buffer 21 is the first sub-second-stage memory Buffer 21 connected to one first-stage memory Buffer 1 (i.e., the first sub-second-stage memory Buffer 21 corresponding to input path 1); when the number of input lanes is 2, the selected first sub-second-stage memory Buffer 21 is the first sub-second-stage memory Buffer 21 connected to two first-stage memories Buffer 1 (i.e., the first sub-second-stage memory Buffer 21 corresponding to input path 2); and when the number of input lanes is 4, the selected first sub-second-stage memory Buffer 21 is the first sub-second-stage memory Buffer 21 connected to four first-stage memories Buffer 1 (i.e., the first sub-second-stage memory Buffer 21 corresponding to input path 3).

As shown in FIG. 6, when the number of output lanes is 4, the selected second sub-second-stage memory Buffer 22 is the second sub-second-stage memory Buffer 22 connected to four third-stage memories Buffer 3 (i.e., the second sub-second-stage memory Buffer 22 corresponding to output path 1); when the number of output lanes is 8, the selected second sub-second-stage memory Buffer 22 is the second sub-second-stage memory Buffer 22 connected to eight third-stage memories Buffer 3 (i.e., the second sub-second-stage memory Buffer 22 corresponding to output path 2); when the number of output lanes is 12, the selected second sub-second-stage memory Buffer 22 is the second sub-second-stage memory Buffer 22 connected to twelve third-stage memories Buffer 3 (i.e., the second sub-second-stage memory Buffer 22 corresponding to output path 3); and when the number of output lanes is 16, the selected second sub-second-stage memory Buffer 22 is the second sub-second-stage memory Buffer 22 connected to sixteen third-stage memories Buffer 3 (i.e., the second sub-second-stage memory Buffer 22 corresponding to output path 4).

The second read signal includes a first sub-second read signal and a second sub-second read signal. The action of reading the data of the corresponding second-stage memory and writing the data into the corresponding third-stage memory, includes: reading data of the corresponding first sub-second-stage memory and writing the data into the corresponding second sub-second-stage memory when the first sub-second read signal is enabled; and reading data of the corresponding second sub-second-stage memory and writing the data into the corresponding third-stage memory when the second sub-second read signal is enabled.

In the embodiment, an input bit width of each first sub-second-stage memory is the same as a total output bit width of one or more first-stage memories to which the first sub-second-stage memory is connected, an output bit width of each first sub-second-stage memory is the same as a total bit width of the output lanes corresponding to a preset minimum output lane number, an input bit width of each second sub-second-stage memory is the same as a total bit width of the output lanes corresponding to a preset minimum output lane number, and an output bit width of each second sub-second-stage memory is the same as a total input bit width of one or more third-stage memories to which the second sub-second-stage memory is connected.

Exemplarily, as shown in FIG. 6, as for the first sub-second-stage memory Buffer 21 corresponding to the input path 1, the number of the first-stage memories Buffer 1 connected thereto is 1, the input bit width is 24 bits, the minimum output lane number is 4, and the output bit width is 96 bits. As for the first sub-second-stage memory Buffer 21 corresponding to the input path 2, the number of the first-stage memories Buffer 1 connected thereto is 2, the input bit width is 48 bits, the minimum output lane number is 4, and the output bit width is 96 bits. As for the first sub-second-stage memory Buffer 21 corresponding to the input path 3, the number of the first-stage memories Buffer 1 connected thereto is 4, the input bit width is 96 bits, the minimum output lane number is 4, and the output bit width is 96 bits.

As shown in FIG. 6, as for the second sub-second-stage memory Buffer 22 corresponding to the output path 1, the minimum output lane number is 4, the input bit width is 96 bits, the number of the third-stage memories Buffer 3 connected thereto is 4, and the output bit width is 96 bits. As for the second sub-second-stage memory Buffer 22 corresponding to the output path 2, the minimum output lane number is 4, the input bit width is 96 bits, the number of the third-stage memories Buffer 3 connected thereto is 8, and the output bit width is 192 bits. As for the second sub-second-stage memory Buffer 22 corresponding to the output path 3, the minimum output lane number is 4, the input bit width is 96 bits, the number of the third-stage memories Buffer 3 connected thereto is 12, and the output bit width is 288 bits. As for the second sub-second-stage memory Buffer 22 corresponding to the output path 4, the minimum output lane number is 4, the input bit width is 96 bits, the number of the third-stage memories Buffer 3 connected thereto is 16, and the output bit width is 384 bits.

In still some exemplary embodiments, one second-stage memory is included, an input bit width of the second-stage memory is equal to a sum of bit widths of all the input lanes, and an output bit width of the second-stage memory is equal to a sum of bit widths of all the output lanes.

As shown in FIG. 7, the sum of the bit widths of all input lanes is 96 bits, the input bit width of the second-stage memory Buffer 2 is 96 bits, the sum of the bit widths of all output lanes is 384 bits, and the output bit width of the second-stage memory Buffer 2 is 384 bits.

In some exemplary embodiments, the action of reading the data of the corresponding second-stage memory and writing the data into the corresponding third-stage memory when the number of input lanes is fixed and the number of output lanes is variable, includes: regarding all data in the second-stage memory as active data and distributing the active data to corresponding output lanes according to the number of output lanes.

In some other exemplary embodiments, the action of reading the data of the corresponding second-stage memory and writing the data into the corresponding third-stage memory when the number of input lanes is variable and the number of output lanes is fixed, includes: selecting active data in the second-stage memory according to the number of input lanes, and distributing the selected active data to all the output lanes.

In still some exemplary embodiments, the action of reading the data of the corresponding second-stage memory and writing the data into the corresponding third-stage memory when the number of input lanes is variable and the number of output lanes is variable, includes: reading the data of the second-stage memory when the second read signal is enabled; selecting active data in the read data according to the number of input lanes; and writing the selected active data into the corresponding third-stage memory according to the number of output lanes.

The data transfer method according to the embodiments of the present disclosure may realize the matching of the interface circuit and the mapping circuit with different numbers of lanes through parameter adjustment, and has good universality. By continuity processing of data and specifying timing output, the risk of errors in data transmission can be reduced, and the design of the back-end circuit can be simplified.

An embodiment of the present disclosure further provides a data transfer device, which may include a processor and a memory storing computer programs capable of running on the processor, wherein when the processor executes the computer programs, act of the data transfer method according to any one of the preceding items in the present disclosure are implemented.

Figure 9:
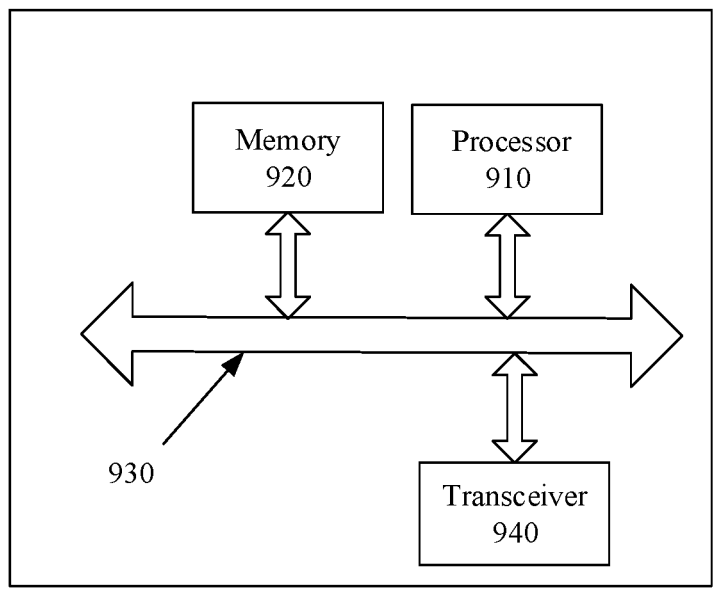
FIG. 9 is a schematic diagram of another structure of a data transfer device according to an embodiment of the present disclosure.

As shown in FIG. 9, in an example, the data transfer device may include: a processor 910, a memory 920, a bus system 930, and a transceiver 940. The processor 910, the memory 920, and the transceiver 940 are connected via the bus system 930, the memory 920 is configured to store instructions, the memory 920 further includes a first-stage memory, a second-stage memory and a third-stage memory, and the processor 910 is configured to execute the instructions stored in the memory 920 to control the transceiver 940 to receive and send a signal. Specifically, the transceiver 940 may obtain a first input of a user under control of the processor 910, the first input including a number of input lanes and/or a number of output lanes; select a corresponding second-stage memory according to the number of input lanes and/or the number of output lanes, and control a first read signal and a second read signal; store data of the input lanes through at least one first-stage memory; read data of the first-stage memory and write the data into a corresponding second-stage memory when the first read signal is enabled; and read data of the corresponding second-stage memory and write the data into a third-stage memory when the second read signal is enabled.

It should be understood that the processor 910 may be a Central Processing Unit (CPU), or the processor 910 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor, or the processor may be any conventional processor, etc.

The memory 920 may include a read-only memory and a random access memory, and provide instructions and data to the processor 910. A portion of the memory 920 may also include a non-volatile random access memory. For example, the memory 920 may also store information of a device type.

The bus system 930 may also include a power bus, a control bus, a status signal bus, or the like in addition to a data bus. However, for clarity of illustration, various buses are all denoted as the bus system 930 in FIG. 9.

In an implementation process, processing performed by the processing device may be completed by an integrated logic circuit of hardware in the processor 910 or instructions in a form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 920. The processor 910 reads information in the memory 920, and completes the acts of the above method in combination with its hardware. In order to avoid repetition, detailed description is not provided herein.

An embodiment of the present disclosure further provides a computer readable storage medium storing executable instructions, and when the executable instructions are executed by a processor, the data transfer method provided by any one of the above embodiments of the present disclosure may be implemented. In the data transfer method, a first input of a user may be obtained, the first input including a number of input lanes and/or a number of output lanes; a corresponding second-stage memory is selected according to the number of input lanes and/or the number of output lanes, and a first read signal and a second read signal are controlled; data of the input lanes is stored through at least one first-stage memory; data of the first-stage memory is read and written into the corresponding second-stage memory when the first read signal is enabled; and data of the corresponding second-stage memory is read and written into the third-stage memory when the second read signal is enabled. Thus, when the number of input lanes and/or the number of output lanes change, the correct adaptation between them can be realized only by modifying parameters, without a complicated process of modifying the code and comprehensively implementing it, thereby improving the debugging efficiency. In addition, when the data input by the input lane is discontinuous, the data transfer device according to the embodiment of the present disclosure may make the output data continuously output, thereby reducing the error risk in the data transmission process and simplifying the design of other modules at the back end. A method for driving the data transfer by executing the executable instructions is basically the same as the data transfer method provided by the above embodiments of the present disclosure, and will not be described repeatedly here.

In some possible embodiments, aspects of the data transfer method provided by the present application may also be implemented in the form of a program product, which includes a program code. When the program product is run on a computer device, the program code is used to enable the computer device to perform the acts in the data transfer method according to various exemplary embodiments of the present application as described in this specification. For example, the computer device may perform the data transfer method described in the embodiments of the present application.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include electrical connections with one or more wires, portable disks, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any suitable combination of the above.

It may be understood by those of ordinary skill in the art that all or some acts in a method and function modules/units in a system and an apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details for implementation without departing from the spirit and scope of the present disclosure. However, the patent protection scope of the present invention should be subject to the scope defined by the appended claims.

The invention claimed is:

1. A data transfer method, applied to a data transfer device comprising at least one first-stage memory, at least one second-stage memory and at least one third-stage memory which are connected in sequence, the method comprising:
   receiving a first input comprising a number of input lanes and/or a number of output lanes;
   selecting a corresponding second-stage memory according to the number of input lanes and/or the number of output lanes, and controlling a first read signal and a second read signal according to the number of input lanes and/or the number of output lanes;
   storing data of the input lanes through the at least one first-stage memory;
   reading data of the at least one first-stage memory and writing the data into the corresponding second-stage memory when the first read signal is enabled; and
   reading data of the corresponding second-stage memory and writing the data into the at least one third-stage memory when the second read signal is enabled.

2. The data transfer method according to claim 1, wherein a number of the at least one first-stage memory is the same as a maximum input lane number, and each first-stage memory is connected to one input lane in one-to-one correspondence.

3. The data transfer method according to claim 1, wherein a number of the at least one third-stage memory is the same as a maximum output lane number, and each third-stage memory is connected to one output lane in one-to-one correspondence.

4. The data transfer method according to claim 1, wherein a number of the at least one second-stage memory is set according to a number of classes of numbers of input lanes, and each second-stage memory is connected to first-stage memories corresponding to a number of input lanes of one class;
   the selecting the corresponding second-stage memory according to the number of input lanes and/or the number of output lanes comprises:
   selecting the corresponding second-stage memory according to the number of input lanes, and selecting multiple corresponding third-stage memories according to a preset number of output lanes.

5. The data transfer method according to claim 4, wherein an input bit width of each second-stage memory is the same as a total output bit width of one or more first-stage memories to which the second-stage memory is connected, and an output bit width of each second-stage memory is the same as a total output bit width of one or more third-stage memories to which the second-stage memory is connected.

6. The data transfer method according to claim 1, wherein a number of the at least one second-stage memory is set according to a number of classes of numbers of output lanes, and each second-stage memory is connected to third-stage memories corresponding to a number of output lanes of one class;
the selecting the corresponding second-stage memory according to the number of input lanes and/or the number of output lanes comprises:
selecting multiple corresponding third-stage memories and one corresponding second-stage memory according to the number of output lanes.

7. The data transfer method according to claim 6, wherein an input bit width of each second-stage memory is the same as a total output bit width of one or more first-stage memories to which the second-stage memory is connected, and an output bit width of each second-stage memory is the same as a total output bit width of one or more third-stage memories to which the second-stage memory is connected.

8. The data transfer method according to claim 1, wherein the second-stage memory comprises a first sub-second-stage memory and a second sub-second-stage memory which are connected in sequence, a number of first sub-second-stage memories is set according to a number of classes of numbers of input lanes, each first sub-second-stage memory is connected to first-stage memories corresponding to a number of input lanes of one class, and a number of second sub-second-stage memories is set according to a number of classes of numbers of output lanes.

9. The data transfer method according to claim 8, wherein an input bit width of each first sub-second-stage memory is the same as a total output bit width of one or more first-stage memories to which the first sub-second-stage memory is connected, an output bit width of each first sub-second-stage memory is the same as a total bit width of output lanes corresponding to a preset minimum output lane number, an input bit width of each second sub-second-stage memory is the same as a total bit width of output lanes corresponding to a preset minimum output lane number of output lanes, and an output bit width of each second sub-second-stage memory is the same as a total input bit width of one or more third-stage memories to which the second sub-second-stage memory is connected.

10. The data transfer method according to claim 8, wherein the second read signal comprises a first sub-second read signal and a second sub-second read signal;
the selecting the corresponding second-stage memory according to the number of input lanes and/or the number of output lanes comprises:
selecting a corresponding first sub-second-stage memory according to the number of input lanes, and selecting a corresponding second sub-second-stage memory and third-stage memory according to the number of output lanes; and
the reading the data of the at least one first-stage memory and writing the data into the corresponding second-stage memory when the first read signal is enabled; and reading the data of the corresponding second-stage memory and writing the data into the at least one third-stage memory when the second read signal is enabled, comprises: reading data of the at least one first-stage memory and writing the data into the corresponding first sub-second-stage memory when the first read signal is enabled; reading data of the corresponding first sub-second-stage memory and writing the data into the corresponding second sub-second-stage memory when the first sub-second read signal is enabled; and reading data of the second sub-second-stage memory and writing the data into the corresponding third-stage memory when the second sub-second read signal is enabled.

11. The data transfer method according to claim 1, wherein the second-stage memory comprises one second-stage memory, an input bit width of the second-stage memory is equal to a sum of bit widths of all the input lanes, and an output bit width of the second-stage memory is equal to a sum of bit widths of all the output lanes;
the reading the data of the corresponding second-stage memory and writing the data into the corresponding third-stage memory when the second read signal is enabled, comprises:
reading data of the second-stage memory when the second read signal is enabled;
selecting active data in the read data according to the number of input lanes; and
writing the selected active data into the corresponding third-stage memory according to the number of output lanes.

12. The data transfer method according to claim 1, further comprising:
controlling a third read signal according to a preset timing; and
reading data of the third-stage memory and distributing the data into the corresponding output lane when the third read signal is enabled.

13. A data transfer device, comprising a memory, and a processor connected to the memory, wherein the memory is configured to store instructions, the memory further comprises a first-stage memory, a second-stage memory, and a third-stage memory, and the processor is configured to perform acts of the data transfer method according to claim 1 based on the instructions stored in the memory.

14. A computer readable non-transitory storage medium, storing a computer program, wherein when the computer program is executed by a processor, the data transfer method according to claim 1 is implemented.

15. A data transfer device, comprising: a lane number control circuit, a data continuity circuit, a data recombination circuit, and a data distribution circuit, wherein
the lane number control circuit is configured to receive a first input comprising a number of input lanes and/or a number of output lanes, select a corresponding first-stage memory and third-stage memory according to the number of input lanes and/or the number of output lanes, and control a first read signal and a second read signal according to the number of input lanes and/or the number of output lanes;
the data continuity circuit comprises at least one first-stage memory and is configured to store data of the input lanes through at least one first-stage memory;
the data distribution circuit comprises at least one third-stage memory; and
the data recombination circuit comprises at least one second-stage memory and is configured to receive the first read signal and the second read signal, read data of the at least one first-stage memory and write the data into a corresponding second-stage memory when the first read signal is enabled; and read data of the corresponding second-stage memory and write the data into the at least one third-stage memory when the second read signal is enabled.

16. The data transfer device according to claim 15, wherein a number of the at least one first-stage memory is the same as a maximum input lane number, and each first-stage memory is connected to one input lane in one-to-one correspondence.

17. The data transfer device according to claim 15, wherein a number of the at least one third-stage memory is the same as a maximum output lane number, and each third-stage memory is connected to one output lane in one-to-one correspondence.

18. The data transfer device according to claim 15, wherein a number of the at least one second-stage memory is set according to a number of classes of numbers of input lanes, and each second-stage memory is connected to first-stage memories corresponding to a number of input lanes of one class; or a number of the at least one second-stage memory is set according to a number of classes of numbers of output lanes, and each second-stage memory is connected to third-stage memories corresponding to a number of output lanes of one class.

19. The data transfer device according to claim 18, wherein an input bit width of each second-stage memory is the same as a total output bit width of one or more first-stage memories to which the second-stage memory is connected, and an output bit width of each second-stage memory is the same as a total output bit width of one or more third-stage memories to which the second-stage memory is connected.

20. The data transfer device according to claim 15, wherein the second-stage memory comprises a first sub-second-stage memory and a second sub-second-stage memory which are connected in sequence, a number of first sub-second-stage memories is set according to a number of classes of numbers of input lanes, each first sub-second-stage memory is connected to first-stage memories corresponding to a number of input lanes of one class, and a number of second sub-second-stage memories is set according to a number of classes of numbers of output lanes.

* * * * *